United States Patent
Stawiszynski et al.

(10) Patent No.: US 11,582,175 B2
(45) Date of Patent: Feb. 14, 2023

(54) SYSTEM, DEVICE AND METHOD FOR SECURE MESSAGE THREAD COMMUNICATION

(71) Applicant: MOTOROLA SOLUTIONS, INC., Chicago, IL (US)

(72) Inventors: Maciej Stawiszynski, Cracow (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 18 days.

(21) Appl. No.: 16/642,123

(22) PCT Filed: Sep. 21, 2017

(86) PCT No.: PCT/PL2017/050047
§ 371 (c)(1),
(2) Date: Feb. 26, 2020

(87) PCT Pub. No.: WO2019/059788
PCT Pub. Date: Mar. 28, 2019

(65) Prior Publication Data
US 2020/0358729 A1    Nov. 12, 2020

(51) Int. Cl.
*H04L 51/10* (2022.01)
*G06F 21/62* (2013.01)
(Continued)

(52) U.S. Cl.
CPC .......... *H04L 51/10* (2013.01); *G06F 21/6245* (2013.01); *H04L 51/04* (2013.01);
(Continued)

(58) Field of Classification Search
CPC ... G06F 21/6245; G06Q 50/26; H04L 51/046; H04L 65/4061; H04L 51/10;
(Continued)

(56) References Cited

U.S. PATENT DOCUMENTS 6,766,517 B1 *  7/2004  Bernardo .................. G06F 9/52
                                                    718/102
8,010,616 B2 *  8/2011  Lee ......................... H04L 51/16
                                                    709/206
(Continued)

FOREIGN PATENT DOCUMENTS

WO     2017116246 A1     7/2017

OTHER PUBLICATIONS

"International Search Report" issued in PCT Application No. PCT/PL2017/050047 dated Jun. 7, 2018, Title: "System, Device and Method for Secure Message Thread Communication".

*Primary Examiner* — Umar Cheema
*Assistant Examiner* — John Fan
(74) *Attorney, Agent, or Firm* — Perry + Currier, Inc.

(57) ABSTRACT

A system, device and method for secure message thread communication is provided. The device comprises a communication interface; a display device; and, a controller configured to: generate, at the display device, a plurality of message threads, the plurality of message threads associated with different incident reports; receive multimedia data for transmission in a first message thread of the plurality of message threads; compare the multimedia data with data from the different incident reports; and when an association is determined between the multimedia data and respective data from an incident report associated with a second message thread, of the plurality of message threads: transmit, using the communication interface, the multimedia data in the second message thread, and not the first message thread.

16 Claims, 10 Drawing Sheets

(51) Int. Cl.
*H04L 51/04* (2022.01)
*H04M 3/51* (2006.01)
*H04L 51/216* (2022.01)
*G06Q 50/26* (2012.01)

(52) U.S. Cl.
CPC ......... *H04L 51/216* (2022.05); *H04M 3/5116* (2013.01); *G06Q 50/26* (2013.01); *H04M 2242/04* (2013.01)

(58) Field of Classification Search
CPC ..... H04L 65/1083; H04L 51/04; H04L 51/14; H04L 51/16; H04L 63/1408; H04M 3/5116; H04M 2242/04
USPC ........................................................ 709/206
See application file for complete search history.

(56) References Cited

U.S. PATENT DOCUMENTS

| | | | |
|---|---|---|---|
| 2006/0190589 A1* | 8/2006 | Parker | H04L 12/185 709/224 |
| 2008/0183832 A1 | 7/2008 | Kirkland et al. | |
| 2009/0157650 A1 | 6/2009 | Chow et al. | |
| 2010/0318620 A1 | 12/2010 | Bansal et al. | |
| 2013/0246897 A1 | 9/2013 | O'Donnell | |
| 2015/0170153 A1* | 6/2015 | Sloan | G06Q 30/016 705/304 |
| 2016/0173421 A1 | 6/2016 | Alshinnawi et al. | |
| 2016/0205052 A1 | 7/2016 | DeLuca et al. | |
| 2017/0024088 A1* | 1/2017 | La Pean | H04W 4/90 |

\* cited by examiner

SYSTEM, DEVICE AND METHOD FOR SECURE MESSAGE THREAD COMMUNICATION

BACKGROUND OF THE INVENTION

In a dispatch center, for example a command center and/or an emergency dispatch center, an operator can have many browsers and/or windows open on one or more displays, the browsers and/or windows for communicating with many first responders (e.g. communication devices of responders, such as police service responders, fire service responders, emergency medical service responders, and the like). Indeed, the operator can be communicating with multiple chatgroups and/or multiple first responders in multiple windows on multiple displays. It is furthermore important that the correct information be provided to the first responders in a secure manner.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
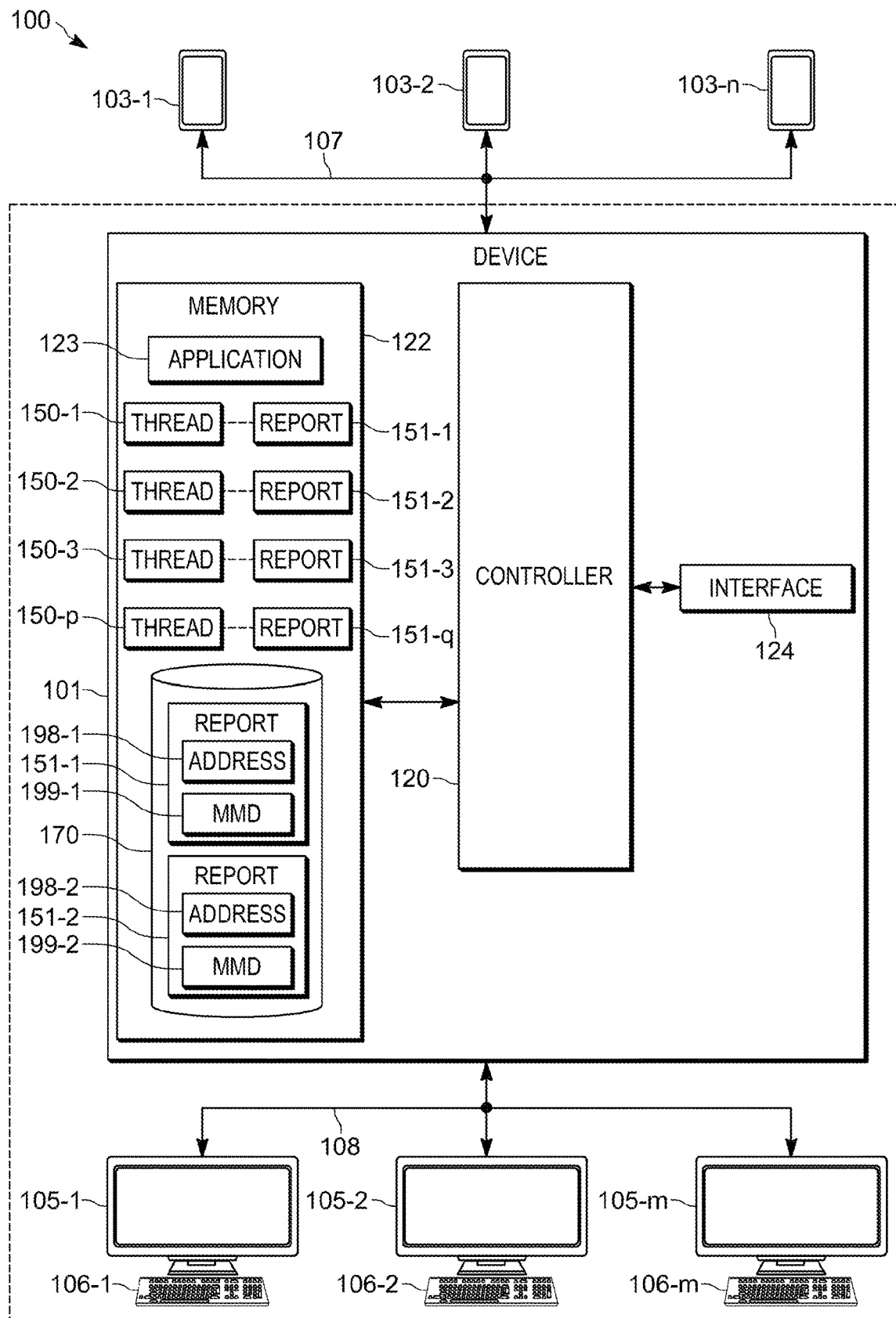
FIG. 1 depicts a system that includes a communication device for secure message thread communication in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In a dispatch center, for example a command center and/or an emergency dispatch center, an operator can have many message threads (e.g. in browsers and/or windows and/or hangout windows) open on one or more displays, message threads for communicating with many first responders (e.g. communication devices of responders, such as police service responders, fire service responders, emergency medical service responders, and the like). Each of the message threads, and the like, is generally associated with an incident report; indeed, more than one message thread may be associated with the same incident report, though generally there are different message threads associated with different incident reports. When data associated with a first incident report is communicated, the data may be transmitted to a message thread that is associated with a second incident report. This may cause sensitive information being transmitted to communication devices that are not associated with the first message thread, which may lead to security issues. The issue may be particularly acute when the data that is incorrectly transmitted is multimedia data; for example, pictures, maps, files, reports, police action data and the like, on narcotics gang members may forwarded to an ambulance worker with no security clearance, rather than a police officer, which could lead to the data regarding the narcotics gang members being leaked.

An aspect of the specification provides: a device comprising: a communication interface; a display device; and, a controller configured to: generate, at the display device, a plurality of message threads, the plurality of message threads associated with different incident reports; receive multimedia data for transmission in a first message thread of the plurality of message threads; compare the multimedia data with data from the different incident reports; and when an association is determined between the multimedia data and respective data from an incident report associated with a second message thread, of the plurality of message threads: transmit, using the communication interface, the multimedia data in the second message thread, and not the first message thread.

Another aspect of the specification provides: a method comprising: generating, using a controller, at a display device in communication with the controller, a plurality of message threads, the plurality of message threads associated with different incident reports; receiving, at the controller, multimedia data for transmission in a first message thread of the plurality of message threads; comparing, at the controller, the multimedia data with data from the different incident reports; and when an association is determined between the multimedia data and respective data from an incident report associated with a second message thread, of the plurality of message threads: transmitting, from the controller, using a communication interface in communication with the controller, the multimedia data in the second message thread, and not the first message thread.

FIG. 1 is a block diagram of a system 100 that includes a device 101 in communication with one or more communication devices 103-1, 103-2 . . . 103-$n$ and one or more display devices 105-1, 105-2 . . . 105-$m$ using, for example, respective communication links 107 to each of the one or more communication devices 103-1, 103-2 . . . 103-$n$ and respective communication links 108 to the one or more display devices 105-1, 105-2 . . . 105-$m$. Each of the one or more display devices 105-1, 105-2 . . . 105-$m$ is associated with one or more input devices 106-1, 106-2 . . . 106-$m$, and the links 108 may be further used for communication between the device 101 and the one or more input devices 106-1, 106-2 . . . 106-$m$. The one or more communication devices 103-1, 103-2 . . . 103-$n$ will be interchangeably referred to hereafter, collectively, as the devices 103, and generically as a device 103. Similarly, the one or more display devices 105-1, 105-2 . . . 105-$m$ will be interchangeably referred to hereafter, collectively, as the display devices 105, and generically as a display device 105. Similarly, the one or more input devices 106-1, 106-2 . . . 106-$m$ will be interchangeably referred to hereafter, collectively, as the input devices 106, and generically as an input device 106.

In specific embodiments, the system 100 comprises components of a dispatch center and/or a command center and/or a computer aided dispatch, including, but not limited to, an emergency dispatch center used to communicate with first responders and/or emergency responders operating the devices 103, and the device 101 comprises a server device and/or a communication device which causes message threads (including, but not limited to, at browsers and/or windows, and the like) to be generated at the one or more display devices 105 which are used to communicate with the devices 103.

As such, each of the one or more display devices 105 and input devices 106 may be components of one or more operator terminals and/or dispatcher terminals used by one or more operators and/or dispatchers which interact with the message threads at the display devices 105 using the input devices 106. Such interactions with the message threads cause actions to be performed which can include, but are not limited to, communications and/or emergency communications between the device 101 and the devices 103, dispatching the emergency responders associated with the devices 103, transmitting data and/or multimedia data in a message thread, and the like. Hence, the devices 103 may alternatively be referred to as target devices 103, in that data received in a given message thread at the device 101 is specifically received for transmission to one or more given target devices 103.

Hence, a number "$n$" of the devices 103 can include as few as one device 103, but can include tens, hundreds and even thousands of devices 103 depending, for example, on a number of first responders and/or emergency responders being managed within the system 100. Furthermore, the devices 103 and/or channels associated with the devices 103 can be organized into talkgroups and each of the message threads provided at the one or more display devices 105 communicate with one device 103 and/or one talkgroup (which can include a plurality of the devices 103).

In some embodiments, one or more of the devices 103 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments including non-mobile radios and non-mobile communication devices.

Furthermore, one or more of the devices 103 may be incorporated into vehicles, and the like (for example emergency service vehicles), as a radio, an emergency radio, and the like.

Indeed, in some embodiments, one or more of the devices 103 are specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

A number "$m$" of the display devices 105 can include as few as one display device 105, but can include tens, hundreds and even thousands of display devices 105 depending, for example, on a size of the dispatch center and/or computer aided dispatch, and/or on a number of operators and/or dispatchers for which the system 100 is configured. Furthermore, one operator and/or dispatcher can be interacting with one display device 105 or a plurality of display devices 105. In the latter embodiment, the displays 105 being used by a single operator are grouped together and/or logically grouped together (for example, by the device 101) such that an association of multimedia data with message threads may be determined for message threads provided at the plurality of display devices 105, as described in more detail below.

Each of the one or more display devices 105 comprises one or more of a cathode ray tube, a flat panel display, a liquid crystal display, an organic light emitting display, and the like. In some embodiments, one or more of the display devices 105 include a touch screen device and the like. Regardless, each of the one or more display devices 105 can be component of an operator terminal and/or dispatcher terminal which includes one or more input devices 106 including, one or more touch screen devices (e.g. incorporated into the one or more of the display devices 105), one or more pointing devices, one or more keyboards (as depicted), and the like.

In some embodiments, the device 101, the one or more display devices 105 and the one or more input devices 106 may be combined into a single device 109, for example a single communication device including, but not limited to, a personal computer, a laptop computer, a tablet, a handheld device, and the like.

Attention is next directed to the device 101 which comprises: a controller 120, a memory 122, storing an application 123, and a communication interface 124, interchangeably referred to hereafter as the interface 124. The controller 120 is generally configured for communication with the one or more display devices 105, and the one or more input devices 106 using the communication interface 124.

The memory 122 further stores a plurality of message threads 150-1, 150-2, 150-3 . . . 150-$p$, each associated with a respective incident report 151-1, 151-2, 151-3 . . . 151-$p$, as indicated by broken lines therebetween. The plurality of message threads 150-1, 150-2, 150-3 . . . 150-*p* will be interchangeably referred to hereafter, collectively, as the message threads 150, and generically as a message thread 150. The plurality of incident reports 151-1, 151-2, 151-3 . . . 151-*p* will be interchangeably referred to hereafter, collectively, as the incident reports 151, and generically as an incident report 151.

In general, each message thread 150 may comprise a group of messages exchanged between the device 101 and one or more of the devices 103. Each of the message threads 150 may be further generated and/or rendered at one or more of the display devices 105, as well as at a display device of a respective device 103. Hence, an operator and/or dispatcher at a display device 105 (and an associated input device 106) may communicate with a responder, and the like, operating a respective device 103, for example to transmit multimedia data files from the device 101 to a respective device 103 (e.g. a target device 103).

Some message threads 150 may comprise messages exchanged between the device 101 and one of the devices 103 (e.g. a private message thread). However, some message threads 150 may comprise messages exchanged between the device 101 and two or more of the devices 103, for example as exchanged in a group chat, a talkgroup, a hangout, a window, a browser and the like (e.g. a group message thread). Furthermore, more than one message thread 150 may be associated with a given device 103; for example, the device 101 may be communicating with a given device 103 in both a group chat message thread and a private message thread.

Furthermore, some of the message threads 150 may be active while other message threads may be inactive. Active message threads 150 are understood to be message threads in which a message has been received or transmitted within a given time period, and inactive message threads 150 are understood to be message threads in which a message has been not been received or transmitted within the given time period. In some embodiments, active message threads 150 may include only message threads 150 that are presently being generated at the displays 105.

Furthermore, the plurality of messages received and transmitted in each of the message threads 150 may be referred to as message thread streams.

An incident report 151 generally comprises data associated with an incident, for example, a law enforcement incident, a fire-fighting incident, a medical emergency incident, and the like. Indeed, each incident report 151 generally comprises data associated with a first responder and/or an emergency responder incident. An incident report 151 may be received from one or more of the devices 103, a 911 call center (not depicted) and the like, and/or an incident report 151 may be generated at the device 101, for example via an operator interacting with a display devices 105 and an input device 106.

Each incident report 151 may include, but is not limited to, data indicative of an address and/or a location of an incident, a type of the incident (e.g. a law enforcement incident, a specific type of law enforcement incident (e.g. car accident, arson, gunshot, officer-down, gang, narcotics, homicide, etc.), a fire-fighting incident, a specific type of fire-fighting incident (e.g. car accident, arson, home fire, business fire, high-rise fire, etc.), a medical incident, a specific type of fire medical incident (e.g. car accident, burns, heart attack, etc.) and the like.

As depicted, each of the message threads 150 is associated with a respective incident report 151, however more than one incident report 151 may be associated with a message thread 150 and vice versa.

Hence, a number "p" of message threads 150 may comprise any number of a plurality of message threads 150 and may depend on a number of devices 103 in the system 100. Similarly, a number "q" of incident reports 151 may comprise any number of a plurality of incident reports 151 and may be less than, more than, or a same number p" of message threads 150.

In some implementations, one or more of the incident reports 151 may be stored at a database 170 at the memory 122 and/or another memory and/or device and/or server accessible to the controller 120. As depicted, only the incident reports 151-1, 151-2 are stored at the database 170, however all of the incident reports 151 may be stored at the database 170 and/or only a portion of the incident reports 151 may be stored at the database 170. Furthermore, data indicative of the respective association between the message threads 150-1, 150-2 and the incident reports 151-1, 151-2 may also be stored at the database 170; in other words, while the incident report 151-2 is depicted in FIG. 1 at the database 170 and in association with the message thread 150-2, the incident report 151-2 may be stored only at the database 170, and the association with the message thread 150-2 may be managed by storing data indicative of the association at the database 170 and/or by including metadata at the message thread 150-2 indicative of the association with the incident report 151-2.

As depicted, each the incident reports 151-1, 151-2 stored in the database 170 include, as example data, a respective address 198-1, 198-2 (interchangeably referred to hereafter, collectively, as the addresses 198 and, generically, as an address 198), at which an associated incident has occurred. However, in other embodiments, an incident report 151 may include no address, or a plurality of addresses.

Each of the incident reports 151-1, 151-2 each further include respective multimedia data (MMD) 199-1, 199-2 (interchangeably referred to hereafter, collectively and generically as the multimedia data 199). Each set of the multimedia data 199 may include, but is not limited to pictures, maps, files, reports, police action data, fire fighter data, medical data, and the like, that includes one or more of images, video and audio, and optionally text, and the like. Indeed, the multimedia data 199 may include any multimedia data.

While the other incident reports 151-3 . . . 151-*q* are not depicted with multimedia data, one or more of the other incident reports 151-3 . . . 151-*q* may include multimedia data.

Furthermore, the multimedia data 199 may be received with a respective incident report 151 and/or the multimedia data 199 may be added to a respective incident report 151, for example using one or more of the operator terminals represented by the display devices 105 and the input devices 106, and/or using one or more of the devices 103.

Alternatively, the multimedia data 199 may not be stored at an incident report 151, but may be associated therewith. In yet further alternatives, the multimedia data 199 may not be associated with any of the incident reports 151. Furthermore, not all the incident reports 151 may include multimedia data 199.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the device 101 is not a generic controller and/or a generic device, but a device specifically configured to implement secure message thread communication functionality. For example, in some embodiments, the device 101 and/or the controller 120 specifically comprises a computer executable engine configured to implement specific secure message thread communication functionality.

The memory 122 comprises a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 1, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement secure message thread communication functionality associated with the application 123. In the illustrated example, when the controller 120 executes the application 123, the controller 120 is enabled to: generate, at a display device 105, a plurality of message threads 150, the plurality of message threads 150 associated with different incident reports 151; receive multimedia data 199 for transmission in a first message thread 150-1 of the plurality of message threads 150; compare the multimedia data 199 with data from the different incident reports 151; and when an association is determined between the multimedia data 199 and respective data from an incident report 151 associated with a second message thread 150-2, of the plurality of message threads 150: transmit, using the communication interface 124, the multimedia data 199 in the second message thread 150-2, and not the first message thread 150-1.

The interface 124 is generally configured to communicate with the one or more display devices 105 using wired and/or wired links 108 as desired, including, but not limited to, cables, WiFi links and the like. In other words, the links 107 can include any suitable combination of wired networks and/or wireless networks.

In some embodiments, the interface 124 is further configured to communicate with the one or more device 103, for example, using one or more communication channels over the links 107. In these embodiments, the interface is implemented by, for example, one or more radios and/or connectors and/or network adaptors, configured to communicate wirelessly, with network architecture that is used to implement one or more communication channels between the device 101 and the display devices 105 and/or a wireless network. In these embodiments, the interface 124 can include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 124 includes one or more local area network or personal area network transceivers operating in accordance with an IEEE 902.11 standard (e.g., 902.11a, 902.11b, 902.11g), or a Bluetooth transceiver which can be used to communicate with the devices 103 and/or the display devices 105. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the one or more devices 103 using other servers and/or communication devices, for example by communicating with the other servers and/or communication devices using, for example, packet-based and/or internet protocol communications, and the like, and the other servers and/or communication devices use radio communications to wirelessly communicate with the one or more devices 103.

Indeed, communication between the device 101, the one or more devices 103 and the one or more display device 105 can further include any suitable combination of wired networks and/or wireless networks. In other words, the links 108 can include any suitable combination of wired networks and/or wireless networks.

In any event, it should be understood that a wide variety of configurations for the system 100 and/or the device 101 are within the scope of present embodiments.

Figure 2:
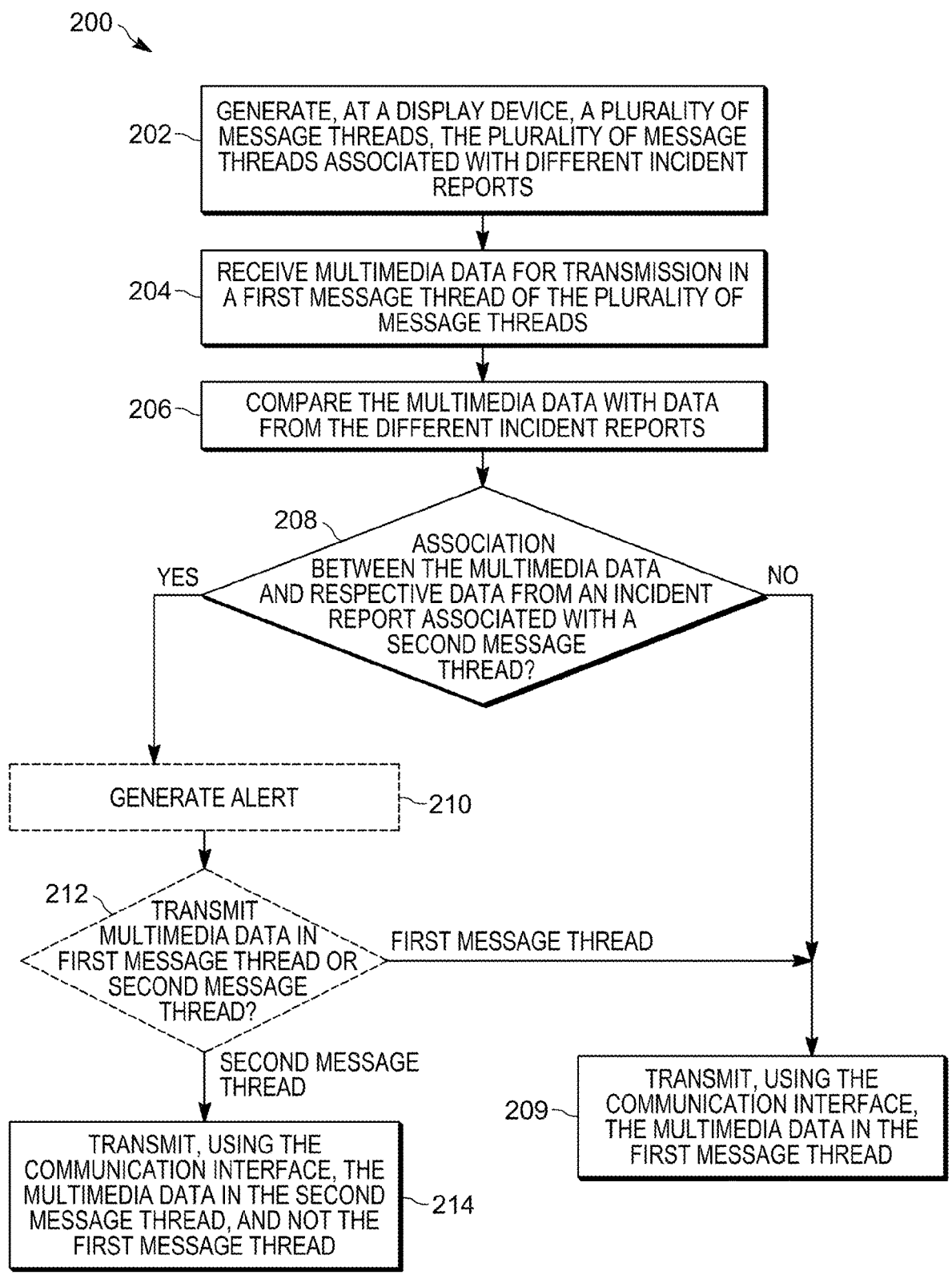
FIG. 2 is a flowchart of a method for secure message thread communication in accordance with some embodiments.

Attention is now directed to FIG. 2 which depicts a flowchart representative of a method 200 for implementing secure method thread communication. In some embodiments, the operations of the method 200 of FIG. 2 correspond to machine readable instructions that are executed by, for example, the device 101 of FIG. 1, and specifically by the controller 120 of the device 101. In the illustrated example, the instructions represented by the blocks of FIG. 2 are stored at the memory 122, for example, as the application 123. The method 200 of FIG. 1 is one way in which the system 100 and/or the device 101 and/or the controller 120 is configured. Furthermore, the following discussion of the method 200 of FIG. 2 will lead to a further understanding of the device 101, and its various components.

However, it is to be understood that the system 100 and/or the device 101 and/or the controller 120 and/or the method 200 may be varied, and need not work exactly as discussed herein in conjunction with each other, and that such variations are within the scope of present embodiments.

Furthermore, the method 200 of FIG. 2 need not be performed in the exact sequence as shown and likewise various blocks may be performed in parallel rather than in sequence. Accordingly, the elements of method 200 are referred to herein as "blocks" rather than "steps".

At a block 202, the controller 120 generates, at a display device 105, a plurality of message threads 150, the plurality of message threads 150 associated with different incident reports 151.

At a block 204, the controller receives multimedia data 199 for transmission in a first message thread 150-1 of the plurality of message threads 150;

At a block 206, the controller 120 compares the multimedia data 199 with data from the different incident reports 151.

At a block 208, the controller 120 determines whether there is an association is between the multimedia data 199 and respective data from an incident report 151 associated with a second message thread 150-2, of the plurality of message threads 150. When no association is determined between the multimedia data 199 and respective data from an incident report 151 associated with a second message thread 150-2, of the plurality of message threads 150 (e.g. a "NO" decision at the block 208), at a block 209, the controller 120 transmits using the communication interface 124, the multimedia data 199 in the first message thread 150-1.

However, when an association is determined between the multimedia data 199 and respective data from an incident report 151 associated with a second message thread 150-2, of the plurality of message threads 150 (e.g. a "YES" decision at the block 208), at an optional block 210, the controller 120 generates an alert, for example, an alert of one or more of: a mismatch between the multimedia data 199 and the first message thread 150-1; and a match between the multimedia data 199 and the second message thread 150-2. In some embodiments, such an alert may include a first selectable option for transmitting the multimedia data 199 in the first message thread 150-1; and a second selectable option for transmitting the multimedia data 199 in the second message thread 150-2.

Hence, at an optional block 212, the controller 120 determines whether to transmit the multimedia data 199 in the first message thread 150-1 or the second message thread 150-2, for example by receiving input at the first selectable option or the second selectable option.

When the controller 120 determines that the multimedia data 199 is to be transmitted in the first message thread 150-1, as described below, the controller 120 implements the block 209.

Otherwise, when the controller 120 determines that the multimedia data 199 is to be transmitted in the second message thread 150-2, as described below, at a block 214, the controller 120 transmits, using the communication interface 124, the multimedia data 199 in the second message thread 150-2, and not the first message thread 150-1.

In some embodiments, however, the block 212 does not occur, and hence when a "YES" decision occurs at the block 208, an alert is generated at the block 210, and at the block 214, the controller 120 transmits, using the communication interface 124, the multimedia data 199 in the second message thread 150-2, and not the first message thread 150-1. In yet further embodiments, neither of the block 212, 214 occur, and hence when a "YES" decision occurs at the block 208, at the block 214, the controller 120 transmits, using the communication interface 124, the multimedia data 199 in the second message thread 150-2, and not the first message thread 150-1.

Example embodiments of the method 200 are now described with reference to FIG. 3 to FIG. 9. Furthermore, each of FIGS. 3, 6, 7 and 8 depict example message threads 150-1, 150-2 and/or active message threads 150-1, 150-2 generated and/or provided and/or rendered and/or displayed at an example display device 305, which can include, but is not limited to one of the display devices 105, or a plurality of the display devices 105 which are grouped and/or logically grouped as described above.

It will be further assumed in the following example that, in the first message thread 150-1, messages and/or data is being exchanged between the device 101 and the device 103-1, and in the second message thread 150-2, messages and/or data is being exchanged between the device 101 and the device 103-2.

Figure 3:
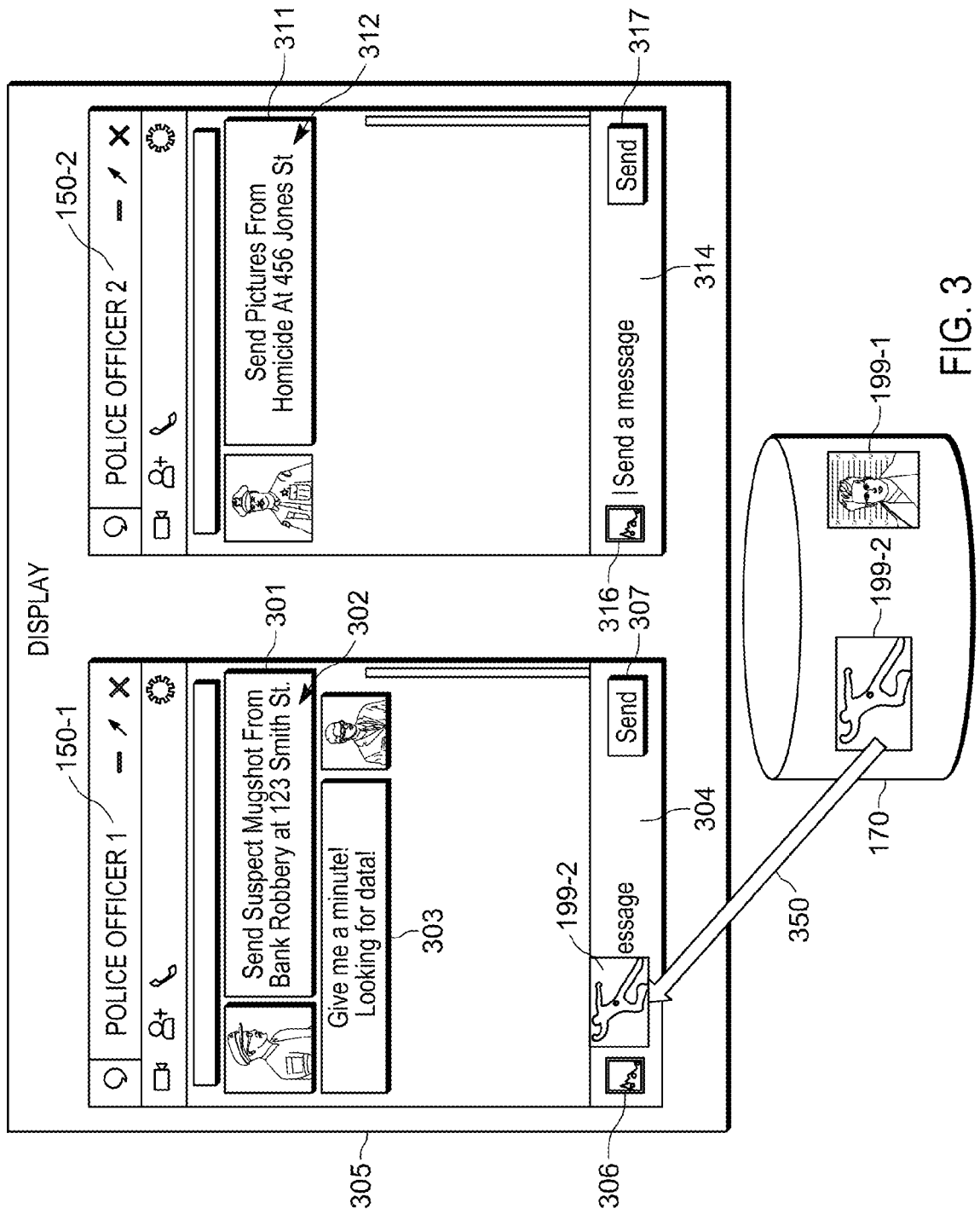
FIG. 3 depicts an example display device that includes message threads to which multimedia data is being received for transmission at a first message thread in accordance with some embodiments.

Attention is next directed to FIG. 3; as depicted, the controller 120 has generated (e.g. at the block 202 of the method 200), at the display device 305, a plurality of message threads 150-1, 150-2, the plurality of message threads 150-1, 150-2 associated with different incident reports (e.g. respectively incident reports 151-1, 151-2). The first message thread 150-1 is named "POLICE OFFICER 1" and comprises a first message 301 received, for example, from the device 103-1, the first message 301 including an address 302 associated with an incident for which information is being requested. The first message thread 150-1 further comprises a second message 303 transmitted, for example, to the device 105-1 from the device 101. The first message thread 150-1 further comprises a field 304 where multimedia data can be received for transmission in the first message thread 150-1, for example via selection of an icon 306, and the like, which can allow an operator and/or a dispatcher at the display device 305 to browse for multimedia data to transmit the first message thread 105-1.

The first message thread 150-1 further comprises an actuatable option 307 (labelled "Send") (e.g. a virtual, button, and the like) which, when actuated (e.g. via receipt of input data at an input device 106) causes any data received at the field 304, including multimedia data selected via the icon 306, as well as any text and the like, to be transmitted in the first message thread 150-1, for example to the device 105-1.

The second message thread 150-2 is named "POLICE OFFICER 2" and comprises a message 311 received, for example, from the second device 105-2, the message 311 including a respective address 312 associated with an incident for which information is being requested. Otherwise, the second message thread 150-2 is similar to the first message thread 150-1 and includes a field 314, icon 316 and actuatable option 317 respectively similar to the field 304, the icon 306 and the actuatable option 307.

While as depicted only two of the message threads 150-1, 150-2 are active and/or being generated at the display device 305, more than two message threads 150 may be active and/or generated at the display device 305.

Furthermore, while as described herein, an association between the message threads 150-1, 150-2 and the incident reports 151-1, 151-2 have already been determined, in some embodiments, the addresses 302, 312 received in each of the message threads 150-1, 150-2 may be used to determine associations between the message threads 150-1, 150-2 and the incident reports 151-1, 151-2. For example, the address 302 may match and/or be similar to the address 198-1 of the incident report 151-1, and/or the address 312 may match and/or be similar to the address 198-2 of the incident report 151-2; the controller 120 may, in some implementations compare the addresses 302, 312 with the incident reports 151 and automatically associate the message threads 150-1, 150-2 with the respective incident reports 151-1, 151-2 when matches and/or similarities between the addresses 302, 312 and the addresses 198-1, 198-2 are determined.

Furthermore, each of the message threads 150-1, 150-2 may be generated when one or more of: a message is received from a respective device 103, a message is transmitted to a respective device 103, an incident report 151 is received from a respective device 103, an incident report is received that is associated with a respective device 103 (e.g.

from a source other than a device 103, for example an automatic dispatch server, a 911 call center, and the like).

Also depicted in FIG. 3 is the database 170, as well as example graphical depictions of each set of the multimedia data 199-1, 199-2 stored in the database 170. In the depicted examples, the multimedia data 199-1 includes a picture of an outline of a homicide victim, and the multimedia data 199-2 includes a mugshot (e.g. a picture) of a suspect.

While the respective incident reports 151-1, 151-2 are not depicted with the database 170 in FIG. 3, they may be nonetheless present, for example in embodiments where the multimedia data 199-1, 199-2 is stored in respective incident reports 151 (e.g. as depicted in FIG. 1).

Furthermore, while the remaining components of the device 101 are not depicted in FIG. 3, they are nonetheless assumed to be present.

In any event, as also depicted in FIG. 3, the multimedia data 199-2 has been selected (e.g. as indicated by the arrow 350) for transmission in the first message thread 150-1, for example, via an operator using an input device 106 to interact with the icon 306 in order to browse the database 170 to select multimedia data 199. Put another way, the multimedia data 199-2 received at the controller 120 (e.g. at the block 204) for transmission in the first message thread 150-1. Hence, if the actuatable option 307 is actuated, the multimedia data 199-2 will be transmitted in the first message thread 150-1.

However, in the depicted example, it is assumed that the multimedia data 199-2 has been incorrectly selected for transmission in the first message thread 150-1, for example as an operator viewing the message threads 150-1, 150-2 may be confused. In particular, in the message 311 of the second message thread 150-2, pictures of a homicide are requested, while in the message 301 of the first message thread 150-1, a mugshot for a robbery is requested. Hence, the operator has mistakenly selected a homicide picture for transmission in the first message thread 150-1 (e.g. which is associated with a robbery), when the homicide picture was requested in the second message thread 150-2.

In other words, the plurality of message threads 150-1, 150-2 being generated at the display device 305 has caused incorrect multimedia 199-2 to be received in the first message thread 150-1, which could cause security issues, for example when the responder operating the device 103-1 associated with the first message thread 150-1 does not have security clearance to view the multimedia 199-2.

Figure 4:
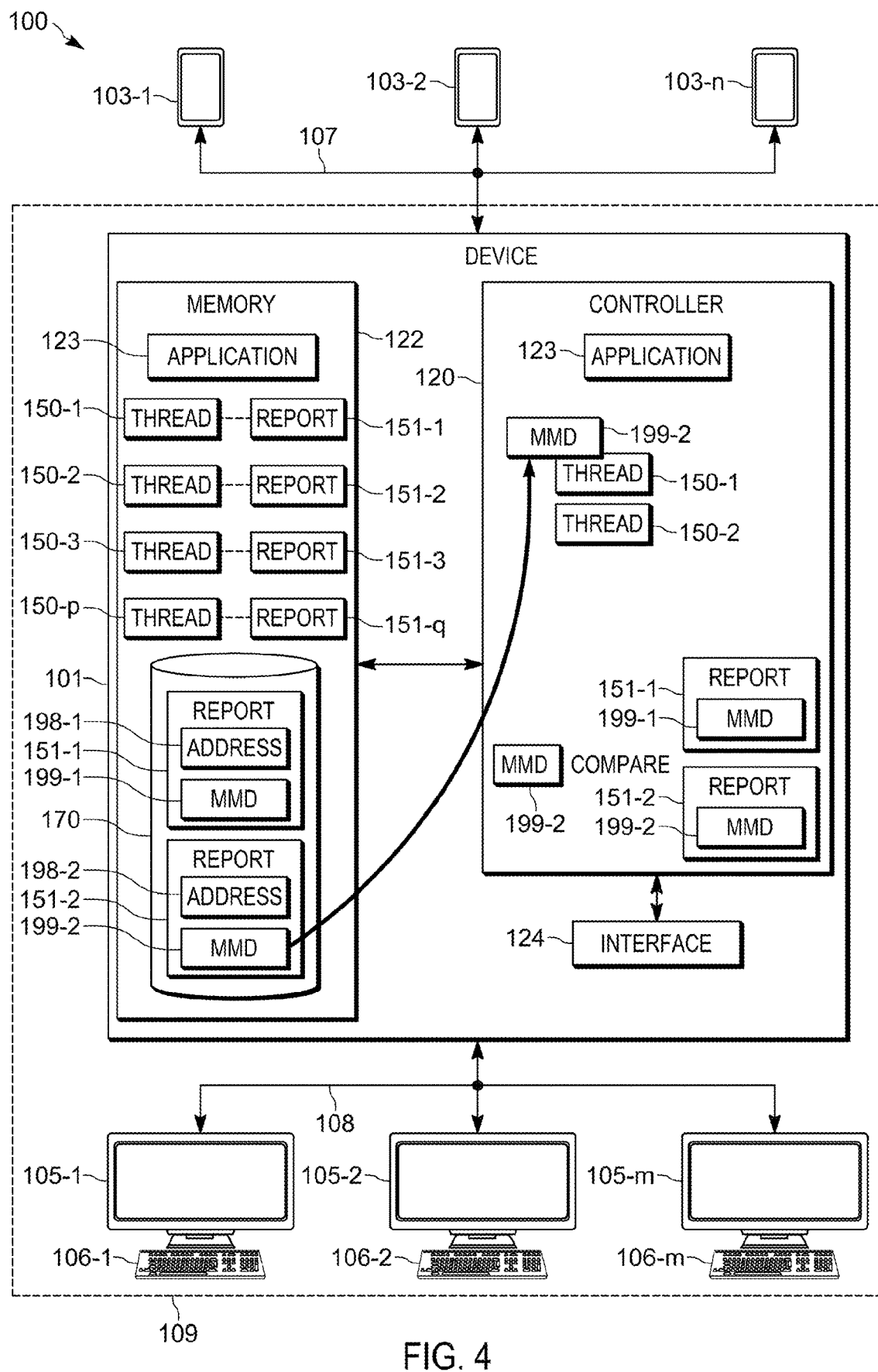
FIG. 4 depicts the communication device comparing the multimedia data with incident reports associated with message threads in accordance with some embodiments.

Hence, attention is next directed to FIG. 4, which is substantially similar to FIG. 1 with like elements having like numbers. In FIG. 4, the controller 120 is depicted as generating the message threads 150-1, 150-2 (e.g. for rendering at the display device 305) and receiving the multimedia data 199-2 at the first message thread 150-1. As in FIG. 3, however, it is assumed that the multimedia data 199-2 has not yet been transmitted in the first message thread 150-1.

When the multimedia data 199-2 is received at the first message thread 150-1, the controller 120 compares (e.g. at the block 206 of the method 200) the multimedia data 199-2 with data from the different incident reports 151-1, 151-2, and/or any incident reports 151 associated with message threads 150 currently being generated at the display device 305 (e.g. one or more of the display device 105, as described above).

In some embodiments, the controller 120 compares the multimedia data 199-2 with all the incident reports 151. However, in other embodiments the controller 120 compares the multimedia data 199-2 only with incident reports 151 associated with message threads 150 that are currently active at the display device 305 (as depicted); in other words, in these embodiments, the controller 120 compares the multimedia data 199-2 only with incident reports 151 associated with message threads 150 that are currently active at an operator terminal and/or dispatcher terminal where the receipt of the multimedia data 199-2 at the first message thread 150-1 originated.

Figure 5:
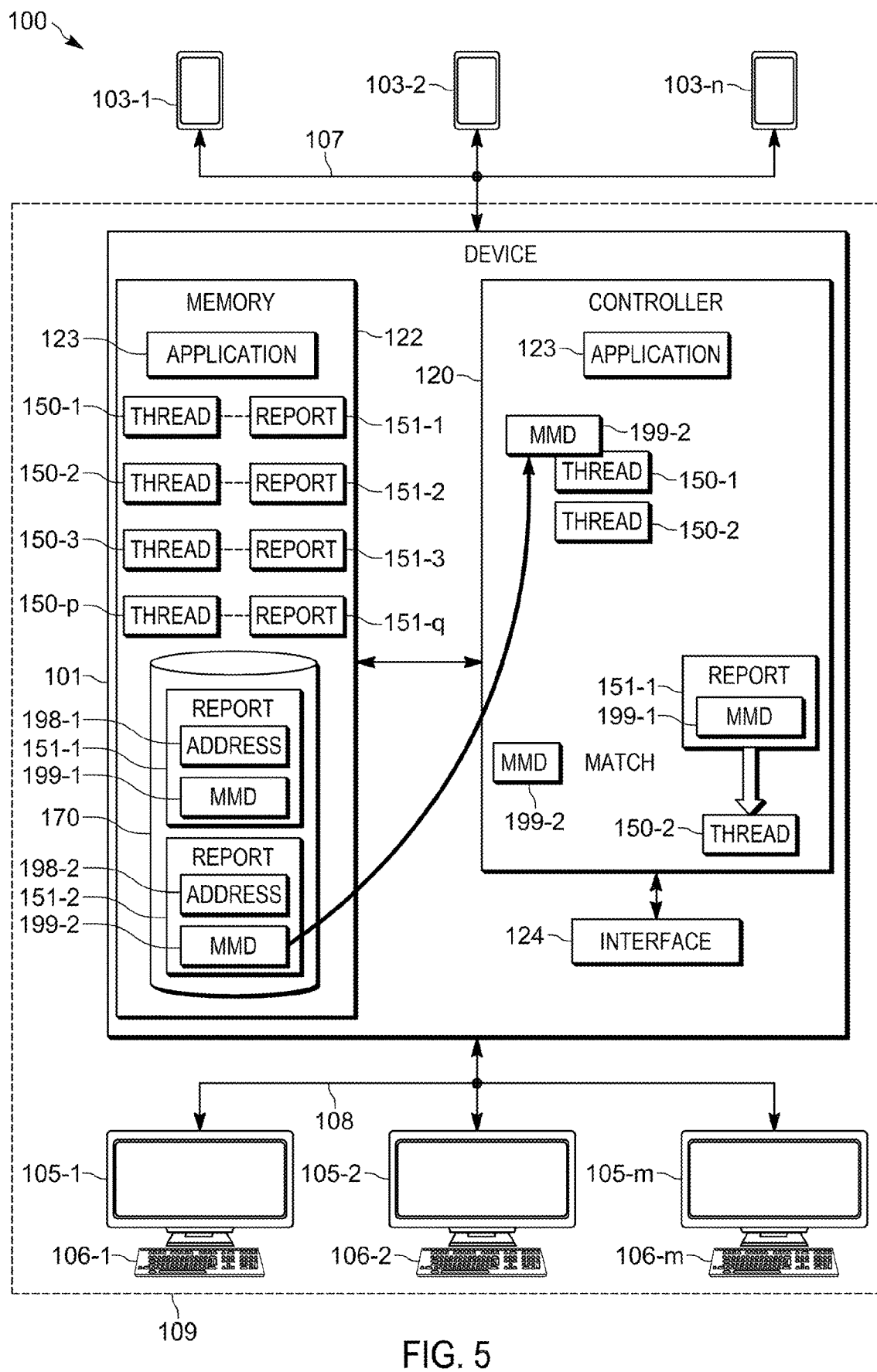
FIG. 5 depicts the communication device determining an association between the received multimedia data with an incident report associated with a second message thread in accordance with some embodiments.

Attention is next directed to FIG. 5, which is substantially similar to FIG. 4 with like elements having like numbers. In FIG. 5, the controller 120 has determined, for example at the block 208, an association between the multimedia data 199-2 and respective data from an incident report 151-2 associated with the second message thread 150-2, of the plurality of message threads 150. In particular, controller 120 has determined a match between the multimedia data 199-2 and the respective data from the incident report 151-2 associated with the second message thread 150-2; in other words, the multimedia data 199-2 received at the field 304 of the first message thread 150-1 matches the multimedia data 199-2 of the incident report 151-2 which is associated with the second message thread 150-2.

Such a determination may be performed in any suitable manner; for example, while an exact match between the multimedia data 199-2 and the respective data from the incident report 151-2 associated with the second message thread 150-2 is described, present embodiments include associations due to one or more of: inexact matches, matches that occur using image comparison algorithms, video comparison algorithms, audio comparison algorithms, and the like.

Furthermore, such an association may occur via comparison of metadata of the multimedia data 199-2 received at the field 304 of the first message thread 150-1. For example, in some implementations, metadata of the multimedia data 199-2 may include an address similar to the address 198-2 of the second incident report 151-2.

Figure 6:
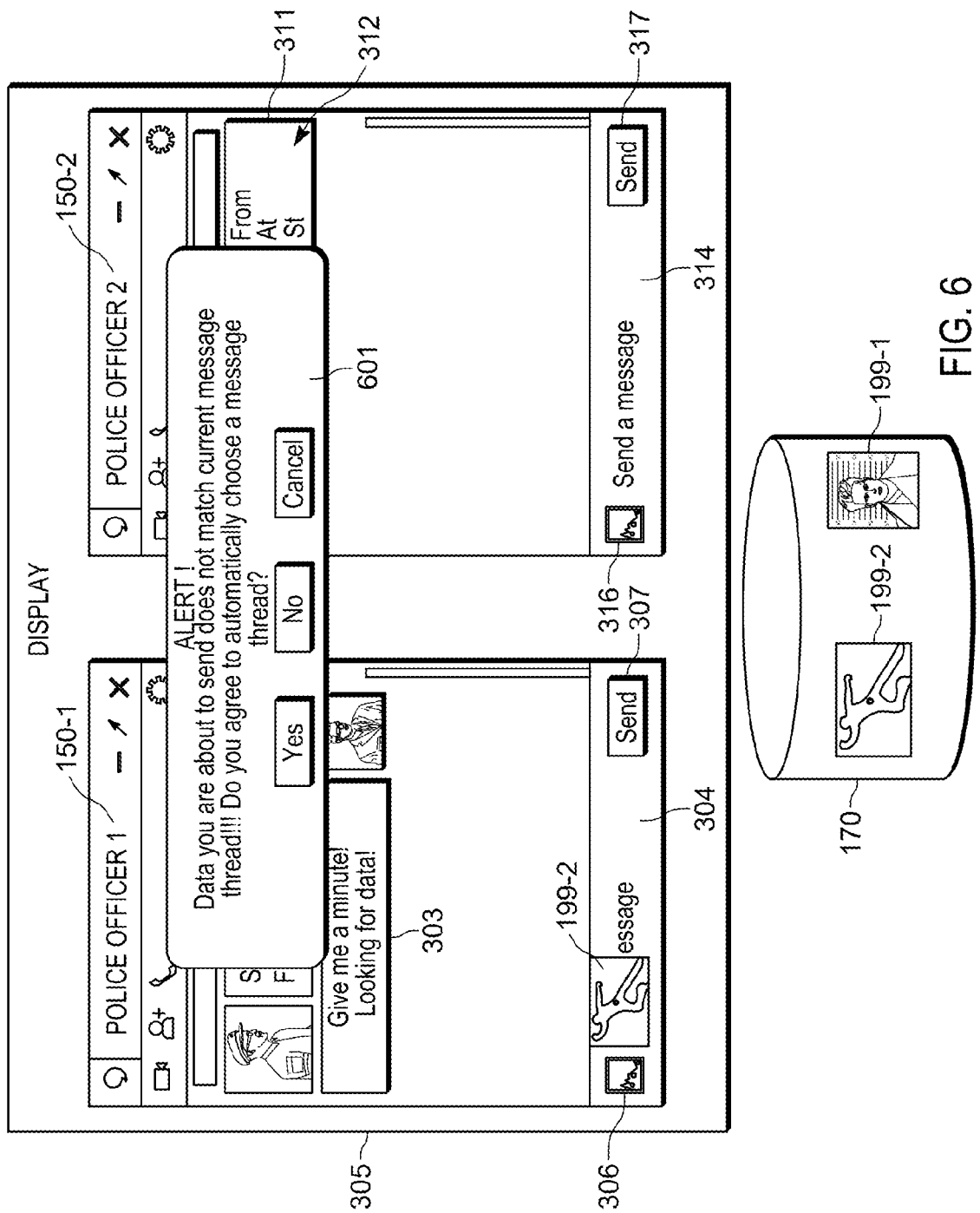
FIG. 6 depicts a first type of alert being generated at the example display device of FIG. 3 in response to determining the association between the multimedia data received at the first message thread, and the incident report associated with a second message thread in accordance with some embodiments.

Attention is next directed to FIG. 6 where, in response to the controller 120 determining (e.g. a "YES" decision at the block 208) the association between the multimedia data 199-2 and the respective data from the incident report 151-2 associated with the second message thread 150-2, the controller 120 (e.g. at the block 210) is generating, at the display device 305, an alert 601 of a mismatch between the multimedia data 199-2 and the first message thread 150-1.

In particular, the alert 601 includes text indicating that data (e.g. the multimedia data 199-2 in the field 304) received for transmission in the first message thread 150-1 does not match the first message thread 150-1. The alert 601 further includes text inquiring as to whether an automatic selection of a message thread is to occur, and three selectable options ("YES", "NO", "CANCEL") are provided which may include virtual buttons, and the like. When the selectable options "NO" or "CANCEL" are selected (e.g. via an input device 106), the method 200 may end, and the controller 120 waits for further input, for example to remove the multimedia data 199-2 from the field 304, selection of other multimedia data 199, transmission of the multimedia data 199-2 in the first message thread 150-1, and the like.

Such a selection of the selectable options "NO" or "CANCEL" may cause a "First Message Thread" decision at the block 212. For example, when the selectable option "NO" is selected, the multimedia data 199-2 may be automatically transmitted in the first message thread 150-1 (e.g. at the block 209 of the method 200); however, when the selectable option "CANCEL" is selected, controller 120 may wait for further input (e.g. such as an actuation of the actuatable option 307, or removal of the multimedia data 199-2 from the first message thread 150-1).

However, when the selectable option "YES" is selected, a "Second Message Thread" decision may occur at the block 212, and the multimedia data 199-2 may be automatically transmitted in the second message thread 150-2 (e.g. at the block 214 of the method 200), as described below.

Figure 7:
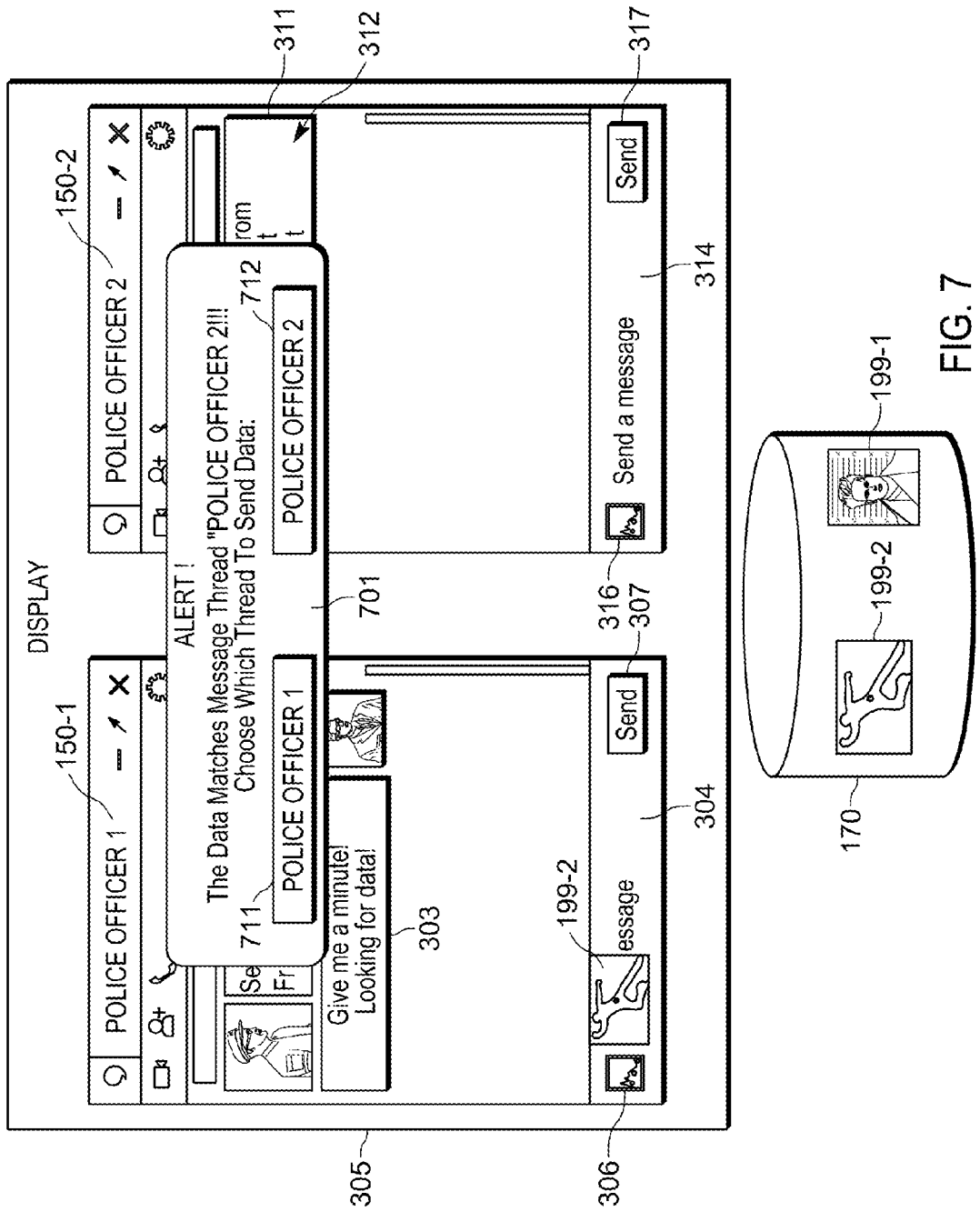
FIG. 7 depicts a second type of alert being generated at the example display device of FIG. 3 in response to determining the association between the multimedia data received at the first message thread, and the incident report associated with a second message thread in accordance with some embodiments.

Alternatively, with reference to FIG. 7, a second alert 701 may be generated which indicates a match between the multimedia data 199-2 received at the first message thread 150-1 and the second message thread 150-2 (e.g. due to the comparison and match described with reference to FIG. 4 and FIG. 5). Alternatively, the alert 701, and the like, is generated (e.g. at the block 210) instead of the alert 601 and/or the alerts 601, 701 may be combined.

In other words, the controller 120 may be further configured to: when an association is determined between the multimedia data 199-2 and the respective data from the incident report 151-2 associated with the second message thread 150-2, generate, at the display device 305, an alert of one or more of: a mismatch between the multimedia data 199-2 and the first message thread 150-1; and a match between the multimedia data 199-2 and the second message thread 150-2.

Regardless, the alert 701 includes: a first selectable option 711 for transmitting the multimedia data 199-2 in the first message thread 150-1; and a second selectable option 712 for transmitting the multimedia data 199-2 in the second message thread 150-2. Each of the selectable options 711, 712 may include, for example, a respective virtual button, and the like, and may be identified (as depicted) via a respective name of each of the message threads 150-1, 150-2.

Selection of the first selectable option 711 may cause a "First Message Thread" decision at the block 212 of the method 200, and the multimedia data 199-2 may then be transmitted in the first message thread 150-1 at the block 209 of the method 200.

However, selection of the second selectable option 712 may cause a "Second Message Thread" decision at the block 212, and the multimedia data 199-2 may then be transmitted in the second message thread 150-2, at the block 214 at the method 200.

Figure 8:
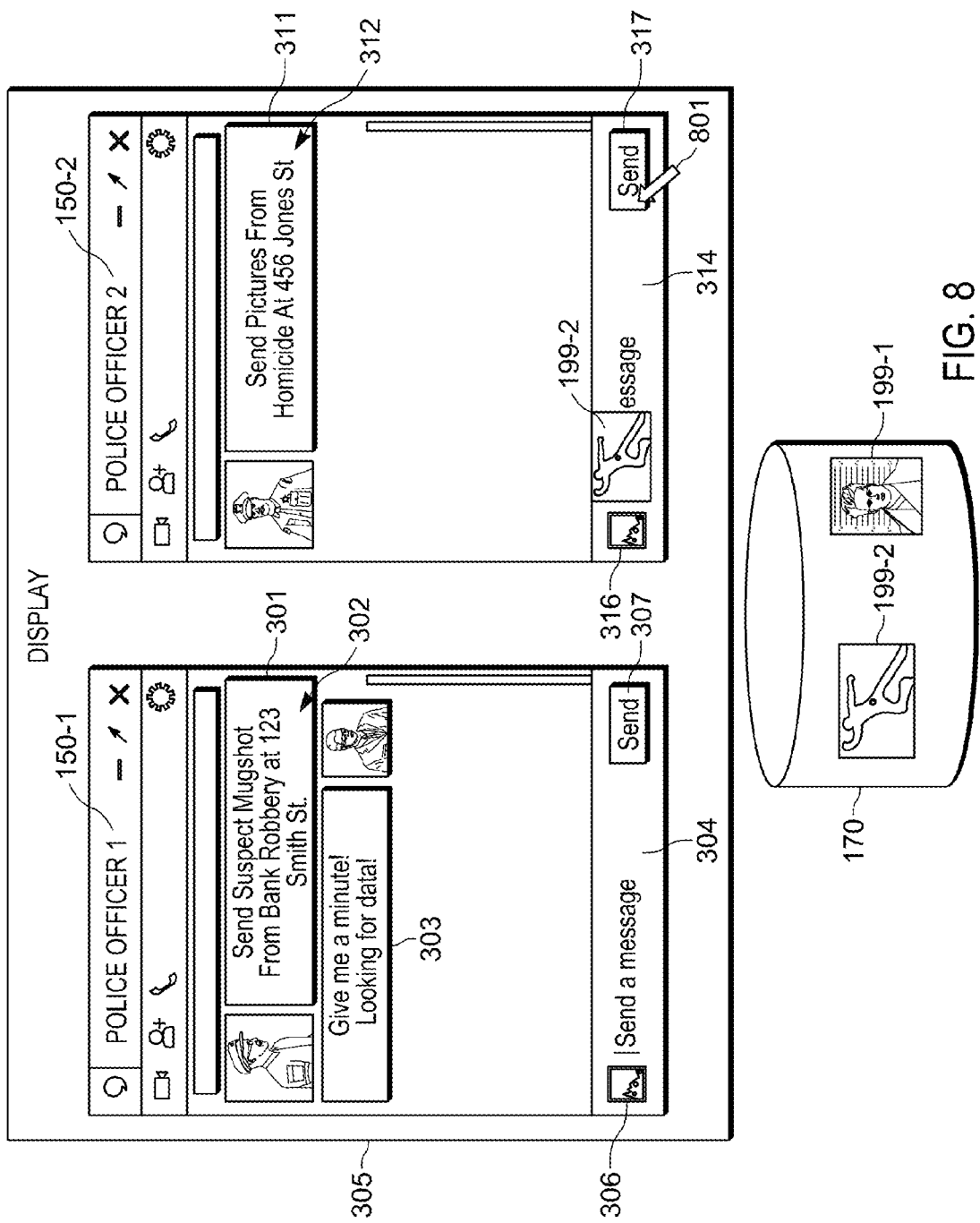
FIG. 8 depicts the multimedia data received at the first message thread moved to the second message thread in accordance with some embodiments.

For example, attention is next directed to FIG. 8 where it is assumed that the selectable option 712 has been selected, which causes the alert 701 to be removed from the display device 305. Furthermore, in response to the selectable option 712 being selected, the multimedia data 199-2 has been automatically moved from the field 304 of the first message thread 150-1 to the field 314 of the second message thread 150-2. In other words, the multimedia data 199-2 has been automatically moved from the first message thread 150-1 to the second message thread 150-2.

Upon actuation of the actuatable option 317 (e.g. as depicted a cursor 801 is being used to actuate the actuatable option 317), the controller 120 transmits (e.g. at the block 214 of the method 200) the multimedia data 199-2 in the second message thread 150-2, and not the first message thread 150-1.

Figure 9:
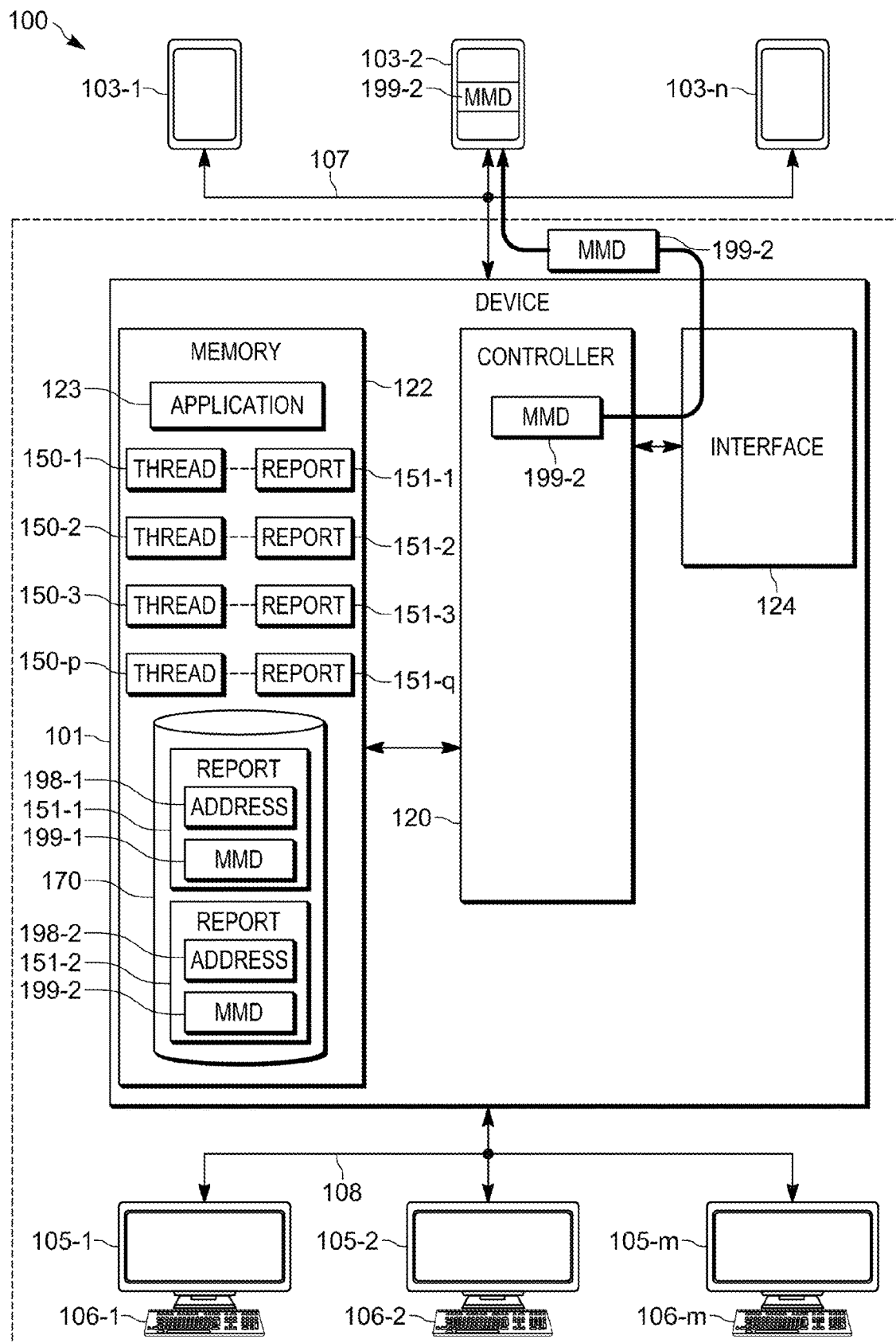
FIG. 9 depicts the multimedia data received at the first message thread being transmitted in the second message thread in accordance with some embodiments.

For example, as depicted in FIG. 9, which is substantially similar to FIG. 1, with like elements having like numbers, the multimedia data 199-2 is transmitted to the device 103-2 and not the device 103-1 via the interface 124. Put another way, as each of the plurality of message threads 150-1, 150-2 is associated with different target devices (e.g. respectively, the devices 103-1, 103-2), the controller 120 may be further configured to transmit, using the communication interface 124, the multimedia data 199-2 in the second message thread 150-2 and not the first message thread 150-1 by: transmitting the multimedia data 199-2 to target devices (e.g. the device 103-2) of the second message thread 150-2 and not respective target devices (e.g. the device 103-1) of the first message thread 150-1. Indeed, when the message thread 150-2 in which the multimedia data 199-2 is transmitted is associated with more than one device 103 (e.g. a group message thread), the multimedia data 199-2 is transmitted to all the target devices 103 in the second message thread 150-2.

Returning, briefly, to FIG. 7 in some embodiments, a selection of the second selectable option 712 may cause the controller 120 to transmit, using the communication interface 124, the multimedia data 199-2 in the second message thread 150-2, and not the first message thread 150-1, when a selection of the second selectable option 712 is received, for example without receipt of further input at the selectable option 317.

In addition, a selection of the first selectable option 711 may cause the controller 120 to transmit, using the communication interface 124, the multimedia data 199-2 in the first message thread 150-1, and not the second message thread 150-2, when a selection of the first selectable option 711 is received.

Hence, described herein is a device and method for secure method thread communication. For example, data, and in particular multimedia data, is prevented from being transmitted in a message thread at which it has been incorrectly received. Put another way, the multimedia data may be automatically moved from a first message thread to a second message thread based on an association determined between the multimedia data and an incident report associated with the second message thread. Hence, for example, sensitive multimedia data is transmitted in an associated message thread and not a message thread at which it has been incorrectly received. Furthermore, as described herein, alerts may be provided of one or more of: a match between multimedia data, received at a first message thread, and a second message thread; and a mismatch between multimedia data and the first message thread.

In yet further embodiments, the controller 120 may be configured to determine associations between multiple message thread streams at the device 101 as messages are received and transmitted in the message threads 150, and determine associations therebetween.

Figure 10:
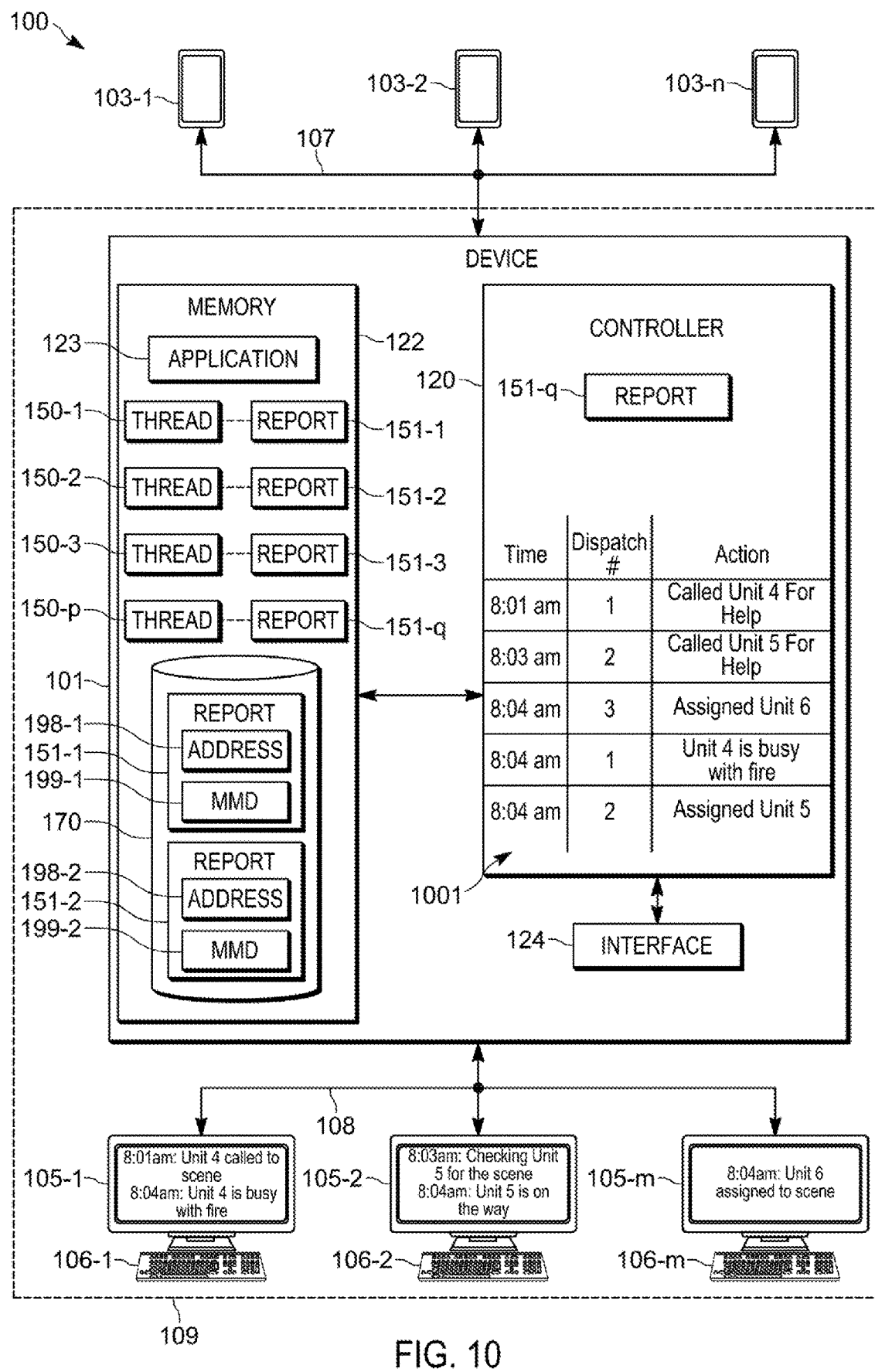
FIG. 10 depicts the communication device compiling a timeline of related message threads from the plurality of message thread streams in accordance with some embodiments.

For example, as depicted in FIG. 10, which is substantially similar to FIG., with like elements having like numbers, different message thread streams are being generated at the various display devices 105, for example to communicate between the different operator and/or dispatcher terminals and/or the devices 103. As depicted, each of the different message thread streams are being generated in response to an incident, which may, in turn, be associated with the incident report 151-$q$, which is being processed at the controller 120.

The controller 120 monitors the plurality of message thread streams associated with the different dispatcher terminals (e.g. as represented by the display devices 105) and compile a timeline 1001 of related message threads from the plurality of message thread streams. The timeline 1001 may include a time at which a message and/or action occurred in a respective message thread stream, an identifier of an associated dispatcher (e.g. as depicted "Dispatch #") and an indication of the message and/or action (e.g. as depicted "Action"). Furthermore, while the timeline 1001 is depicted as being arranged in rows and columns in a tabular format, the timeline 1001 may be in any suitable format. The timeline 1001 may also be stored in the memory 122 and/or the database 170 for later searching and/or reference.

Associations between the plurality of message thread streams may be determined by their respective associations with the common incident report 151-*q* and/or by using text and/or data in each of the plurality of message thread streams. For example, as depicted, each of the plurality of message thread streams at the display devices 105 refer to a "scene" which may be used to determine associations therebetween.

In any event, as depicted, the controller 120 may be further configured to: monitor a plurality of message thread streams associated with different dispatcher terminals at a computer aided dispatch; and compile a timeline of related message threads from the plurality of message thread streams.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A device comprising:
   a communication interface; a display device; and, a controller configured to:
   generate, at the display device, a plurality of active message threads, the plurality of active message threads associated with different incident reports that are different from the plurality of active message threads, wherein the different incident reports comprise data associated with one or more of an emergency responder incident, a law enforcement incident, a fire-fighting incident and a medical emergency incident;

receive multimedia data for transmission in a first active message thread of the plurality of active message threads, the multimedia data comprising one or more of an image, video and audio;

compare the multimedia data with data from the different incident reports; and determine a match between the multimedia data and respective data from an incident report associated with a second active message thread of the plurality of active message threads, and transmit, using the communication interface, the multimedia data in the second active message thread, and not the first active message thread, the first active message thread and the second active message thread both being active prior to receiving the multimedia data, wherein the controller is further configured to automatically move the multimedia data from the first message thread to the second message thread based on an association determined between the multimedia data and the incident report associated with the second message thread, wherein each of the plurality of active message threads is associated with different target devices, and the controller is further configured to transmit, using the communication interface, the multimedia data in the second active message thread and not the first active message thread by: transmitting the multimedia data to target devices of the second active message thread and not respective target devices of the first active message thread.

2. The device of claim 1, wherein the controller is further configured to:

when the association is determined between the multimedia data and the respective data from the incident report associated with the second active message thread, generate, at the display device, an alert of one or more of: a mismatch between the multimedia data and the first active message thread; and a match between the multimedia data and the second active message thread.

3. The device of claim 2, wherein the alert includes: a first selectable option for transmitting the multimedia data in the first active message thread; and a second selectable option for transmitting the multimedia data in the second active message thread, wherein the controller is further configured to:

transmit, using the communication interface, the multimedia data in the second active message thread, and not the first active message thread, when a selection of the second selectable option is received.

4. The device of claim 3, wherein the controller is further configured to: transmit, using the communication interface, the multimedia data in the first active message thread, and not the second active message thread, when a selection of the first selectable option is received.

5. The device of claim 1, wherein the controller is further configured to, when the association is determined between the multimedia data and the respective data from the incident report associated with the second active message thread: automatically transmit the multimedia data in the second active message thread.

6. The device of claim 1, wherein the controller is further configured to determine the association between the multimedia data and the respective data from the incident report associated with the second active message thread by: determining a match between the multimedia data and the respective data from the incident report associated with the second active message thread.

7. The device of claim 1, wherein the controller is further configured to receive the multimedia data from one or more of: an input device; the incident report associated with the second active message thread; and a database.

8. The device of claim 1, wherein the controller is further configured to determine the match between the multimedia data and the respective data from the incident report associated with the second active message thread by determining that the multimedia data matches respective multimedia data from the incident report associated with the second active message thread.

9. A method comprising:

generating, using a controller, at a display device in communication with the controller, a plurality of active message threads, the plurality of active message threads associated with different incident reports that are different from the plurality of active message threads, wherein the different incident reports comprise data associated with one or more of an emergency responder incident, a law enforcement incident, a firefighting incident and a medical emergency incident;

receiving, at the controller, multimedia data for transmission in a first active message thread of the plurality of active message threads, the multimedia data comprising one or more of an image, video and audio;

comparing, at the controller, the multimedia data with the data from the different incident reports; and determining a match between the multimedia data and respective data from an incident report associated with a second active message thread of the plurality of active message threads and, transmitting, from the controller, using a communication interface in communication with the controller, the multimedia data in the second active message thread, and not the first active message thread, the first active message thread and the second active message thread both being active prior to receiving the multimedia data, wherein the method further comprises automatically moving the multimedia data from the first message thread to the second message thread based on an association determined between the multimedia data and the incident report associated with the second message thread, wherein each of the plurality of active message threads is associated with different target devices, and wherein the method further comprises: transmitting, from the controller, using the communication interface, the multimedia data in the second active message thread and not the first active message thread by: transmitting the multimedia data to target devices of the second active message thread and not respective target devices of the first active message thread.

10. The method of claim 9, further comprising:

when the association is determined between the multimedia data and the respective data from the incident report associated with the second active message thread, generating, using the controller, at the display device, an alert of one or more of: a mismatch between the multimedia data and the first active message thread; and a match between the multimedia data and the second active message thread.

11. The method of claim 10, wherein the alert includes: a first selectable option for transmitting the multimedia data in the first active message thread; and a second selectable option for transmitting the multimedia data in the second active message thread, and wherein the method further comprises:

transmitting, from the controller, using the communication interface, the multimedia data in the second active message thread, and not the first active message thread, when a selection of the second selectable option is received.

12. The method of claim 11, further comprising: transmitting, from the controller, using the communication interface, the multimedia data in the first active message thread, and not the second active message thread, when a selection of the first selectable option is received.

13. The method of claim 9, further comprising: when the association is determined between the multimedia data and the respective data from the incident report associated with the second active message thread: automatically transmitting, from the controller, using the communication interface, the multimedia data in the second active message thread.

14. The method of claim 9, further comprising: determining, at the controller, the association between the multimedia data and the respective data from the incident report associated with the second active message thread by: determining a match between the multimedia data and the respective data from the incident report associated with the second active message thread.

15. The method of claim 9, further comprising: receiving, at the controller, the multimedia data from one or more of: an input device; the incident report associated with the second active message thread; and a database.

16. The method of claim 9, wherein determining the match between the multimedia data and the respective data from the incident report associated with the second active message thread comprises determining that the multimedia data matches respective multimedia data from the incident report associated with the second active message thread.

\* \* \* \* \*